Jan. 27, 1953 R. H. GERKE 2,626,882
SELF-SEALING FUEL CELL
Filed June 26, 1951
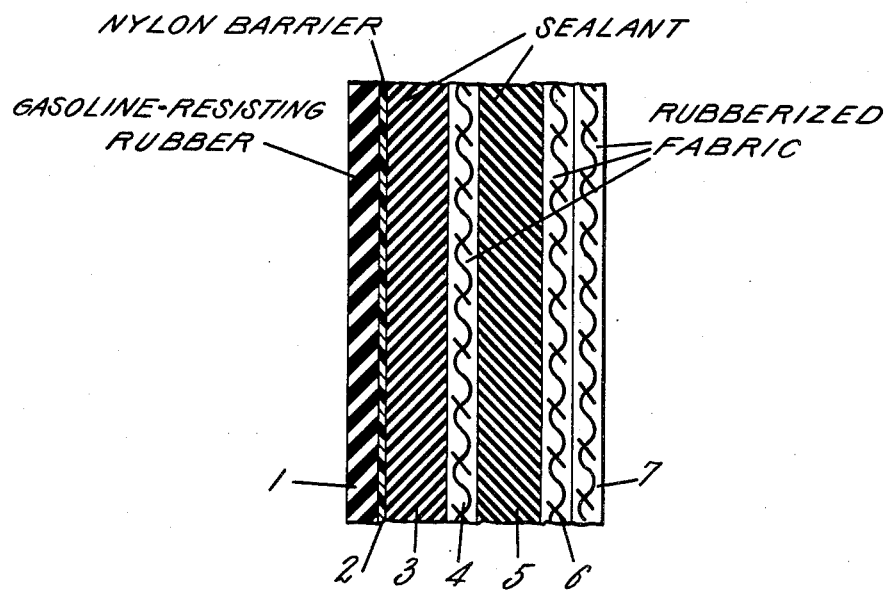
INVENTOR.
ROSCOE H. GERKE
BY
ATTORNEY Patented Jan. 27, 1953

2,626,882

UNITED STATES PATENT OFFICE 2,626,882

SELF-SEALING FUEL CELL

Roscoe H. Gerke, Nutley, N. J., assignor to United States Rubber Company, New York, N. Y., a corporation of New Jersey Application June 26, 1951, Serial No. 233,670

10 Claims. (Cl. 154—43.5)

This invention relates to a self-sealing fuel cell and more particularly to a Mareng bullet-sealing fuel cell. Still more particularly it relates to an improved rubber sealant composition for such cells.

At the present time natural rubber is used in compounding the rubber sealant layer or layers for self-sealing fuel cells in preference to synthetic rubber because natural rubber formulations which have been developed for a wide curing range have good sealant action in the fuel after being torn by a bullet, whereas previous experimental synthetic rubber sealants, e. g., those made from butadiene-styrene rubbery copolymer, have exhibited the disadvantage of narrow curing range for good sealant action. The tensile strength of satisfactory sealant vulcanizates ranges from 25 to 75 pounds per square inch and in some instances up to as high as 150 pounds per square inch. Sealant vulcanizates are likely to dissolve in the fuel if their tensile strength is less than 25 pounds per square inch. For successful production of bullet-sealing fuel cells it is necessary to provide a rubber formulation which gives a vulcanizate having good sealant properties over a wide range of cures, e. g., 15 to 120 minutes at 60 pounds' steam pressure.

A recently established specification instituted by the United States Air Corps rules out natural rubber for sealant layers for self-sealing fuel cells because natural rubber crystallizes upon standing for 96 hours at —40° C. Certain types of synthetic rubbers, such as those which are termed "arctic" rubbers, readily swell in the fuel and do not possess this disadvantage of crystallizing or hardening at —40° C. which seriously interferes with the sealing action and which may in fact induce chunking out of the fuel cell wall by the bullet. My invention is based upon my discovery of a particular compounding technique whereby it is possible to produce a synthetic rubber sealant vulcanizate having good sealant properties over a wide range of cures, namely, 15 to 120 minutes at 60 pounds' steam pressure, so that the production of fuel cells embodying my invention is commercially feasible.

My invention comprises the compounding of a non-crystallizable synthetic rubber having in the uncured state a cohesive energy density of from 56 to 72 (determined by the well-known method as shown, for example, in the book by Hildebrand and Scott, entitled "The Solubility of Nonelectrolytes," 3d edition, 1950, published by Reinhold) in a sulfur recipe containing no zinc oxide and embodying the following four features which are essential for the attainment of the desired results:

(1) A very low sulfur content, namely, from 0.1 to 0.4% by weight based on the synthetic rubber component, and preferably from 0.2 to 0.3%. This low sulfur content is necessary in order that the 400% modulus of the vulcanizate may be within the requisite range of from 25 to 150 pounds per square inch. This low sulfur content is in contrast to the amounts of from 1.5 to 3% which are ordinarily used for vulcanization to soft rubber.

(2) Magnesium oxide, calcium oxide or barium oxide in place of zinc oxide. The use of magnesium, calcium or barium oxide widens the permissible range of times of vulcanization for good sealant action. Specifically, the use of such oxides prevents disintegration of the 15-minute cures (at 60 pounds' steam pressure) in the fuel in the sealant seal test. The amount of magnesium, calcium or barium oxide used in the practice of my invention ranges from 1 to 5% on the rubber, amounts of from 1 to 2% being preferred.

(3) The use of from 5 to 25% of a rubber-reinforcing carbon black, preferably from 10 to 20% thereof, in the formulation to further improve sealant action. Again the use of carbon black in these amounts prevents the disintegration of the 15-minute cures in the sealant seal test. The combination of the magnesium, calcium or barium oxide and the carbon black eliminates disintegration of the sealant in the fuel in the sealant seal test for the short, i. e., 15-minute cures.

(4) An abnormally high amount of an organic accelerator of sulfur vulcanization. The amount of the accelerator ranges from 0.5 to 4.0%, amounts of from 0.5 to 2.0% being preferred. This high amount of accelerator causes rapid reaction of all of the sulfur used with the rubber for all the cures, including the shortest, i. e., the 15-minute cures at 60 pounds steam pressure, and brings about the attainment of the maximum modulus for all cures. In the language of the rubber compounder, the amount of the accelerator used is sufficiently large to "drive the entire amount of the sulfur in" within all curing times in the range of from 15 to 120 minutes at 60 pounds' steam pressure.

My new synthetic rubber sealant compositions easily meet the new Air Corps specification calling for a sealant layer which does not crystallize or otherwise harden upon standing for 96 hours at —40° C. The new sealant of my invention does not crystallize or undergo amorphous hardening at temperatures ranging from —40° C. downwardly to —50° C., and many of my sealants do not crystallize or otherwise harden at temperatures ranging as low as —60° or even as low as —70° C. The sealant layers of my invention are readily adaptable to use in existing methods of fuel cell construction, i. e., my sealant layers can simply be substituted for the natural rubber sealant layers which have been used in the commercial production of fuel cells up until the present time. My sealant compositions give vulcanizates which have the characteristics required in a successful sealant layer over such a wide range of curing times that they are eminently adapted to use in commercial production of fuel cells. In other words, my invention can be readily installed in already established fuel cell production facilities without complications incident to insufficient or excessive curing. If the sealant layer is insufficiently cured, the rubber is very apt to be washed away in the fuel, preventing a seal. On the other hand, if the sealant layer is cured excessively, it will not swell sufficiently in the fuel to close the opening formed by the bullet within the requisite short time.

In the practice of my invention the synthetic rubber, the sulfur, the magnesium, calcium or barium oxide, the carbon black and the organic accelerator are compounded in the conventional manner to form an intimate homogeneous mixture, the usual care being taken to prevent undesired premature vulcanization or "scorching" of the rubber during the preparation of the mixture. The resulting mixture is then calendered or otherwise formed into sheets of the desired thickness for use in the walls of the fuel cell. If desired, other compounding ingredients may be incorporated prior to the calendering step with a view to imparting desirable processing properties. For example, conventional softeners can be included in the formulation.

The uncured calendered sheets are then assembled with other desired components (all rubber parts of which are uncured but contain curatives) into the structure of the final fuel cell whereupon the assembly is cured in the conventional manner. The sealant layer of my invention can be employed in place of the conventional natural rubber sealant layer heretofore used in making fuel cells.

Although the actual construction of the fuel cell constitutes no part of my invention, the accompanying drawing portrays diagrammatically a greatly enlarged cross-section of the wall of a typical fuel cell having two sealant layers made in accordance with my invention. The wall of the cell embodies an inside lining layer 1 of butadiene-acrylonitrile rubbery copolymer highly resistant to attack by the fuel, a thin continuous barrier layer 2 of nylon, a sealant layer 3 prepared in accordance with my invention, a ply 4 of rayon tire cord which has been rubberized on both sides with a butadiene-acrylonitrile rubbery copolymer resistant to the fuel, a second sealant layer 5 embodying my invention, and two outer plies 6 and 7 identical with ply 4. The fuel cell is assembled layer by layer and provided with necessary fittings after which it is vulcanized.

After a bullet passes through the wall of the fuel cell, the relatively stiff plies of tire cord spring back together, thus closing the tear made by the bullet. The fuel starts to flow through the tear and swells the sealant in the assembly thus effecting the seal.

The synthetic rubber used in accordance with my invention must be non-crystallizing, i. e., it must not undergo crystallization at any temperature, however low. The synthetic rubber should also be one which does not undergo amorphous hardening in use even under extreme low temperature conditions since otherwise it would not swell and seal with the necessary rapidity. Thus it should not undergo amorphous hardening at temperatures as low as −40° C. and preferably should not undergo such hardening even when subjected to temperatures as low as −70° C.

The synthetic rubber used in the practice of my invention should have a high degree of swellability by the hydrocarbon fuels used whether such fuels be highly paraffinic or contain a large proportion of aromatics. I have found that a convenient measure of the swellability of the uncured synthetic rubber is the "cohesive energy density" as defined by Hildebrand and Scott on page 424 of the above-cited book by them and determined by measurement of maximum swelling of the uncured synthetic rubber in solvents of known cohesive energy density. As previously stated, synthetic rubbers which are suitable for use in the present invention have a cohesive energy density ranging from 56 to 72 in the uncured state.

A wide variety of synthetic rubbers can be used in the practice of my invention. In general I employ homopolymers of aliphatic conjugated diolefin hydrocarbons or copolymers of such diolefin hydrocarbons with copolymerizable compounds such as other aliphatic conjugated diolefin hydrocarbons or monoolefinic compounds. Examples of such copolymers are butadiene-styrene rubbery copolymers such as ordinary GR–S. Instead of ordinary GR–S, I prefer to employ copolymers of butadiene with styrene or other monomer which have substantially lower amorphous hardening temperatures than GR–S. Thus I have obtained unusually satisfactory results using the butadiene-styrene rubbery copolymer known as X–489 which is a copolymer of 95% butadiene and 5% styrene made at 50° C. and having an amorphous hardening temperature of −88° C. I have also obtained excellent results using a copolymer of 75% butadiene and 25% isoprene made at 5° C. Still another example of a copolymer which has been extremely satisfactory is a ternary copolymer of 75% butadiene, 10% isoprene and 15% butyl acrylate made at 5° C.

In practicing my invention the raw stock is so compounded that upon vulcanization the maximum modulus which is attainable is from 25 to 150 pounds per square inch at 400% elongation. The sealant composition of my invention is vulcanized to such an extent that it has a modulus within the indicated range.

As has been previously indicated, a marked advantage of the sealant compositions of my invention is that they exhibit excellent sealing properties over such a wide range of curing times that they lend themselves ideally to use under ordinary production conditions. Thus the compositions of my invention can be cured for times ranging from 15 to 120 minutes at a temperature corresponding to 60 pounds' steam pressure (about 307° F.) or can be cured for equivalent times at other curing temperatures, e. g., at any temperature of from 275° F. to 350° F. Thus my invention eliminates the disintegration in the fuel of the sealant vulcanizate obtained at short times of cure, and at the same time avoids failure to seal at the longer times of cure because of excessive strength and nerve or snappiness of the vulcanizate when swollen by the fuel, because of the curling of the edges of the tear.

The rubber-reinforcing carbon black employed may be any of the reinforcing and semi-reinforcing grades of rubber blacks having an average particle size of less than 0.070 micron.

The following examples illustrate my invention in greater detail. All parts are by weight.

EXAMPLES 1 TO 25

Sealant compositions as set forth in the table below were prepared by banding the rubbery polymer on an open rubber mill, adding the other ingredients and mixing until homogeneous. After mixing, the stock was sheeted from the mill to the proper thickness for molding and vulcanizing. The mold cavity was 0.06 inch deep. The molded stocks were vulcanized by placing the mold with its proper loading of stock between the platens of a steam-heated hydraulic press for the times and at the pressure shown in the table. One-half inch dumbell test pieces were then died from the vulcanizate slabs and tested in a Scott testing machine for tensile strength or 400% modulus. A circular test piece of 1⅝ inches diameter was died from the 0.06 inch vulcanizate slab. For room temperature sealant seal tests a slot 1″ x 1/16″ was made by means of a die in the circular test piece along a diameter. For −70° C. tests a 1″ slit was used instead of a slot because of the slower swell and seal. The test piece was placed on a small circular 100 mesh stainless steel screen in the bottom of a special steel cup, in the bottom of which was a shallow circular depression for the test piece. Semi-circular hold-down weights were then placed on the test piece with the space between the weights registering with the slot or slit in the test piece. These weights held the test piece in place so that a seal was effected when the edges of the slot or slit pressed together as a result of the swelling. Test fuel (60% isooctane plus 40% aromatics) was poured on top of the test piece in the steel cup. When fuel no longer flowed through the slot or slit a seal had been effected. The time required to effect the seal is the measurement of the test. Complete sealing in less than 2 hours is required to pass the test. The slot used for room temperature tests represents an exaggerated condition in comparison with the bullet tear in the fuel cell and naturally takes longer to seal.

Referring to Table I, Example 4 illustrates the practice of the present invention. It will be noted that both the 15- and 120-minute cures of Example 4 sealed satisfactorily at room temperature and thus possessed a wide curing range for satisfactory cures. The designation "slow" for the performance of the material of Example 4 in the −70° C. sealant seal test refers to a borderline case between "no seal" and "seal" in the test, i. e. "slow" means there is a slow, continuous drip of fuel, which does not stop during the test.

Example 1, which lacked carbon black and magnesium oxide, showed disintegration for the 15-minute cure. Example 3, which lacked carbon black, behaved similarly. Example 2, which lacked only magnesium oxide, is exceptional since magnesium oxide or its equivalent is essential for practical production of fuel cells in accordance with my invention. Example 5, which was like Example 4 but contained only 0.1% of sulfur, was satisfactory. Example 6, which contained 0.4% of sulfur, was unsatisfactory with respect to the sealing of the 120-minute cure in the room temperature test, and in the 400% modulus for this cure. Thus is illustrated the desirability of the 0.2 to 0.3% sulfur range.

*Table—Sealant recipes and data*

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| X-489 (Note 1) | 100 | 100 | 100 | 100 | 100 | 100 | 100 | 100 | 100 | 100 | 100 | 100 | 100 | 100 | 100 | | | | 100 | 100 | 100 | 100 | 100 | 100 | 100 |
| GR-S (Note 2) | | | | | | | | | | | | | | | | 100 | | | | | | | | | |
| J-2576 (Note 3) | | | | | | | | | | | | | | | | | 100 | | | | | | | | |
| B-213 (Note 4) | | | | | | | | | | | | | | | | | | 100 | | | | | | | |
| Philblack O (carbon black) | | 15 | | 15 | 15 | 15 | 5 | 25 | 45 | | | | | | | | | | | | | | | | |
| Gastex (carbon black) | | | | | | | | | | | 15 | | | | | | | | | | | | | | |
| Statex K (carbon black) | | | | | | | | | | | | 15 | | | | | | | | | | | | | |
| Kosmobile 66 (carbon black) | | | | | | | | | | | | | 15 | | | | | | | | | | | | |
| Spheron 6 (carbon black) | | | | | | | | | | | | | | 15 | | | | | | | | | | | |
| Micronex II (carbon black) | | | | | | | | | | | | | | | 15 | | | | | | | | | | |
| Wyex (carbon black) | | | | | | | | | | 15 | | | | | | 15 | 15 | 15 | 15 | 15 | 15 | 15 | 15 | 15 | 15 |
| Light Calcined Mahnesium Oxide | | | 2 | 2 | 2 | 2 | | | | 2 | 2 | 2 | 2 | 2 | 2 | 2 | 2 | 2 | 2 | 2 | 2 | 2 | 2 | 2 | 2 |
| Tetramethylthiuram Monosulfide | 1 | 1 | 1 | 1 | 1 | 1 | 1 | 1 | 1 | 1 | 1 | 1 | 1 | 1 | 1 | 1 | 1 | 1 | | .1 | 1.0 | 4.0 | | | |
| Mercaptobenzothiazole | | | | | | | | | | | | | | | | | | | | | | | 1 | | |
| Diphenyl Guanidine | | | | | | | | | | | | | | | | | | | | | | | | 1 | |
| Beutene (Butyraldehyde-aniline Reaction Product) | | | | | | | | | | | | | | | | | | | | | | | | | 1 |
| Sulfur | .2 | .2 | .2 | .2 | .1 | .4 | .2 | .2 | .2 | .2 | .2 | .2 | .2 | .2 | .2 | .2 | .2 | .2 | .2 | .2 | .2 | .2 | .2 | .2 | |

PERFORMANCE IN ROOM TEMPERATURE SEALANT SEAL TEST

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| Cured: 15 min. at 60 lbs. | D | OK | D | OK | OK | OK | D | OK | OK | OK | D | OK | OK | OK | OK | OK | OK | OK | D | D | OK | OK | OK | OK | OK |
| 120 min. at 60 lbs. | OK | OK | OK | OK | OK | NSC | OK | OK | NS | OK | OK | OK | OK | OK | OK | OK | OK | OK | OK | OK | OK | OK | OK | OK | OK |

PERFORMANCE IN −70° C. SEALANT SEAL TEST

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| Cured: 15 min. at 60 lbs. | | | | | | | OK | OK | | | | | | | | OK | OK | OK | OK | OK | D | OK | OK | OK | OK |
| 120 min. at 60 lbs. | | | Slow | OK | | | OK | NS | NS | OK | OK | OK | OK | OK | OK | OK | OK | OK | OK | OK | OK | OK | OK | OK | OK |

400% MODULUS, P. S. I.

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| Cured: 15 min. at 60 lbs. | 41 | *49 | 35 | 56 | 49 | | 47 | *37 | *57 | *125 | 59 | 47 | 56 | 54 | 42 | 47 | **70 | 90 | 179 | *47 | *48 | *47 | *57 | *83 | *49 | *76 |
| 120 min. at 60 lbs. | 66 | *106 | 56 | 120 | 81 | | 163 | *75 | *116 | *208 | | 86 | 113 | 86 | 83 | 68 | **127 | 141 | 234 | *76 | *71 | *88 | *130 | *192 | 93 | *138 |

NOTE 1.—95 butadiene-5 styrene, 50° C.
NOTE 2.—79 butadiene-21 styrene, 50° C.
NOTE 3—75 butadiene-25 isoprene, 5° C.
NOTE 4—75 butadiene-10 styrene-15 butylacrylate, 5° C.
*Tensile strength instead of 400% modulus.
**GR-S usually does not seal at −70° C.
D=test piece disintegrated and was observed on the screen beneath the test piece.
OK=sample sealed because of swelling action.
NS=no seal of sealant by the fuel.
C=edges of swollen test piece curled, instead of pushing flatly together.

Examples 7, 8 and 9 illustrate the fact that 45% of the furnace type of carbon black known as Philblack O is excessive in that the 120-minute cure of Example 9 did not seal in either sealant seal test and the 400% moduli are excessively high. Comparison of Examples 4 and 7 to 9 shows that the carbon black dosage may range from 5 to 25% but that 10 to 20% is preferable.

Examples 10, 13, 14 and 15 show that the channel blacks known as Wyex, Kosmobile 66, Spheron 6 and Micronex II are satisfactory. Example 12 shows that Statex K, which is a gas furnace black of fine particle size, is also satisfactory. All of the above-mentioned blacks have an average particle size less than 0.070 micron. Example 11 shows that Gastex, which is a coarse furnace black, having an average particle size greater than 0.070 micron, is not a satisfactory carbon black for use in my invention.

Examples 16, 17 and 18, which used formulations identical with Example 4 except that the rubbers used were GR-S, J-2576 and B-213, respectively, show that these synthetic rubbers are satisfactory for use even down to −70° C. It is to be noted that Example 16 is exceptional in that it sealed at −70° C. even though it was based upon GR-S. GR-S formulations usually fail to seal at this temperature.

Example 19, which used no accelerator, was unsatisfactory in that the 15-minute cure disintegrated in both the room temperature and −70° C. seal tests. Example 20 shows that an ordinary amount, viz., 0.1%, of the accelerator tetramethylthiuram monosulfide, is inadequate, whereas Examples 21 and 22 show that the use of 1% and 4%, respectively, of this accelerator gives satisfactory results. As previously stated, the preferred dosage of the organic accelerator ranges from 0.5 to 2%. Larger doses are unnecessary and add excessively to the cost.

Example 23 shows the use of mercaptobenzothiazole, Example 24 the use of diphenyl guanidine, and Example 25 the use of a butyraldehyde-aniline reaction product, as the accelerator. It will be seen that any conventional organic accelerator of sulfur vulcanization of rubber is satisfactory for use in the present invention provided it is used in the amount specified above. Usually the accelerator will be selected from the group consisting of thiurams, thiazoles, guanidines and aldehyde-amines.

EXAMPLE 26

A fuel cell was constructed using as the sealant the composition of Example 4 above. This cell was cured in the conventional manner. It was filled with test fuel (60% isooctane plus 40% aromatics), chilled for four days at −40° C., and while at this temperature was fired with a 50-calibre machine-gun in the conventional testing manner. The fuel cell walls sealed almost immediately after the bullet passed through.

EXAMPLE 27

This example shows that a GR-S formulation which does not embody the principles of my invention is wholly unsatisfactory as a sealant layer for fuel cells.

The following formulation which was developed after considerable work in an effort to make a fuel cell sealant composition based upon GR-S rather than natural rubber (Hevea), is currently being used in some fuel cells:

| | Parts by weight |
|---|---|
| Standard GR-S | 100 |
| Guayule | 23.6 |
| Softener | 6 |
| Gastex (carbon black) | 7.5 |
| Zinc oxide | 3.5 |
| Tetramethylthiuram disulfide | 0.335 |
| Mercaptobenzothiazole | 0.335 |
| Sulfur | 0.335 |

Samples of this formulation were cured for 15 and 120 minutes at 60 pounds' steam pressure and were then tested for 400% modulus and for performance in the sealant seal tests referred to above. The 15-minute cure had a 400% modulus of 144 p. s. i. and disintegrated in both the room temperature and the −70° C. seal tests. The 120-minute cure had a 400% modulus of 158 p. s. i. and exhibited no seal by the fuel in the room temperature seal test. In addition, the edges of the swollen test piece curled instead of pushing flatly together.

Accordingly, it will be seen that previous sealant formulations based upon conventional GR-S compounding principles are wholly unsatisfactory. The narrow curing range is particularly objectionable, the 15-minute cure disintegrating and the 120-minute cure curling and failing to seal.

To recapitulate, the most important property of a rubbery polymer used in a sealant in a self-sealing fuel cell is good swelling, i. e., its cohesive energy density must be similar in value to that of the fuel. A second requirement is absence of crystallization. A third requirement is good flexibility at low temperatures. This requirement is best met by X-489. Although polymers J-2576, B-213 and GR-S are not as good at low temperatures as X-489, they are of decided value in making fuel cells in accordance with my invention. Many other synthetic rubbery polymers than those which have been mentioned are also suitable for use in my invention. The sealant layer is vulcanized to a low degree of vulcanization so as to prevent disintegration of the sealant by the fuel. My invention is based in part upon the discovery that excessive dosages of sulfur result in curling at the tear and failure to seal, whereas use of the amounts of sulfur specified above obviates these difficulties. My invention is further based upon the discovery that the use of magnesium oxide, such as light calcined magnesia, or its equivalent together with carbon black of the type exemplified by channel black and fine furnace black gives a wider range of cures, bringing about good functioning of the 15- and 120-minute cures and prevents the 15-minute cures from disintegrating in the fuel. My invention is further distinguished in that my sealant vulcanizates are free from zinc oxide.

From the foregoing it will be seen that the present invention provides a simple and highly effective solution to the problem of replacing the natural rubber sealant layers of fuel cells with vulcanizates which will meet the new Air Corps specification with regard to absence of crystallization upon standing 96 hours at −40° C. Numerous other advantages of my invention will be readily apparent to those skilled in the art.

Having thus described my invention, what I claim and desire to protect by Letters Patent is:

1. In a bullet-sealing fuel cell, a sealant layer comprising a zinc oxide-free vulcanizate of a non-crystallizable synthetic rubber selected from the group consisting of rubbery copolymers of butadiene and styrene, rubbery copolymers of butadiene and isoprene, and rubbery ternary copolymers of butadiene, isoprene and butyl acrylate, said synthetic rubber having in the uncured state a cohesive energy density of from 56 to 72, from 0.1 to 0.4% of sulfur, from 1 to 5% of an oxide of a metal selected from the group consisting of magnesium, calcium and barium, from 5 to 25% of rubber-reinforcing carbon black having an average particle size less than 0.070 micron, and from 0.5 to 4% of an organic accelerator of sulfur vulcanization, said percentages being by weight based on the weight of said rubber.

2. In a bullet-sealing fuel cell, a sealant layer comprising a zinc oxide-free vulcanizate of a non-crystallizable synthetic rubber selected from the group consisting of rubbery copolymers of butadiene and styrene, rubbery copolymers of butadiene and isoprene, and rubbery ternary copolymers of butadiene, isoprene and butyl acrylate, said synthetic rubber having in the uncured state a cohesive energy density of from 56 to 72, from 0.2 to 0.3% of sulfur, from 1 to 2% of magnesium oxide, from 10 to 20% of rubber-reinforcing carbon black having an average particle size less than 0.070 micron, and from 0.5 to 2% of an organic accelerator of sulfur vulcanization, said percentages being by weight based on the weight of said rubber.

3. In a bullet-sealing fuel cell, a sealant layer comprising a zinc oxide-free vulcanizate of a butadiene-styrene rubbery copolymer having in the uncured state a cohesive energy density of from 56 to 72, from 0.1 to 0.4% of sulfur, from 1 to 5% of an oxide of a metal selected from the group consisting of magnesium, calcium and barium, from 5 to 25% of rubber-reinforcing carbon black having an average particle size less than 0.070 micron and from 0.5 to 4% of an organic accelerator of sulfur vulcanization, said percentages being by weight based on the weight of said copolymer.

4. In a bullet-sealing fuel cell, a sealant layer comprising a zinc oxide-free vulcanizate of a butadiene-styrene rubbery copolymer having in the uncured state a cohesive energy density of from 56 to 72, from 0.2 to 0.3% of sulfur, from 1 to 2% of magnesium oxide, from 10 to 20% of rubber-reinforcing carbon black having an average particle size less than 0.070 micron, and from 0.5 to 2% of an organic accelerator of sulfur vulcanization, said percentages being by weight based on the weight of said copolymer.

5. In a bullet-sealing fuel cell, a sealant layer comprising a zinc oxide-free vulcanizate of a rubbery copolymer of 95% butadiene and 5% styrene made at approximately 50° C., said copolymer having in the uncured state a cohesive energy density of from 56 to 72, from 0.1 to 0.4% of sulfur, from 1 to 5% of an oxide of a metal selected from the group consisting of magnesium, calcium and barium, from 5 to 25% of rubber-reinforcing carbon black having an average particle size less than 0.070 micron, and from 0.5 to 4% of an organic accelerator of sulfur vulcanization, said percentages being by weight based on the weight of said copolymer.

6. In a bullet-sealing fuel cell, a sealant layer comprising a zinc oxide-free vulcanizate of a rubbery copolymer of 95% of butadiene and 5% styrene made at approximately 50° C., said copolymer having in the uncured state a cohesive energy density of from 56 to 72, from 0.2 to 0.3% of sulfur, from 1 to 2% of magnesium oxide, from 10 to 20% of rubber-reinforcing carbon black having an average particle size less than 0.070 micron, and from 0.5 to 2% of an organic accelerator of sulfur vulcanization, said percentages being by weight based on the weight of said copolymer.

7. In a bullet-sealing fuel cell, a sealant layer comprising a zinc oxide-free vulcanizate of a rubbery copolymer of 95% of butadiene and 5% styrene made at approximately 50° C., said copolymer having in the uncured state a cohesive energy density of from 56 to 72, from 0.2 to 0.3% of sulfur, from 1 to 2% of magnesium oxide, from 10 to 20% of rubber-reinforcing carbon black having an average particle size less than 0.070 micron, and from 0.5 to 2% of tetramethylthiuram monosulfide, said percentages being by weight based on the weight of said rubber.

8. In a bullet-sealing fuel cell, a sealant layer comprising a zinc oxide-free vulcanizate of a rubbery copolymer of 95% of butadiene and 5% styrene made at approximately 50° C., said copolymer having in the uncured state a cohesive energy density of from 56 to 72, from 0.2 to 0.3% of sulfur, from 1 to 2% of magnesium oxide, from 10 to 20% of rubber-reinforcing carbon black having an average particle size less than 0.070 micron and from 0.5 to 2% of mercaptobenzothiazole, said percentages being by weight based on the weight of said rubber.

9. In a bullet-sealing fuel cell, a sealant layer comprising a zinc oxide-free vulcanizate of a rubbery copolymer of 95% of butadiene and 5% styrene made at approximately 50° C., said copolymer having in the uncured state a cohesive energy density of from 56 to 72, from 0.2 to 0.3% of sulfur, from 1 to 2% of magnesium oxide, from 10 to 20% of rubber-reinforcing carbon black having an average particle size less than 0.070 micron, and from 0.5 to 2% of diphenyl guanidine, said percentages being by weight based on the weight of said rubber.

10. In a bullet-sealing fuel cell, a sealant layer comprising a zinc oxide-free vulcanizate of a rubbery copolymer of 95% of butadiene and 5% styrene made at approximately 50° C., said copolymer having in the uncured state a cohesive energy density of from 56 to 72, from 0.2 to 0.3% of sulfur, from 1 to 2% of magnesium oxide, from 10 to 20% of rubber-reinforcing carbon black having an average particle size less than 0.070 micron, and from 0.5 to 2% of a butyraldehyde-aniline reaction product, said percentages being by weight based on the weight of said rubber.

ROSCOE H. GERKE.

REFERENCES CITED

The following references are of record in the file of this patent:

UNITED STATES PATENTS

| Number | Name | Date |
|---|---|---|
| Re. 21,572 | Ott | Sept. 17, 1940 |
| 2,287,774 | Bacon et al. | June 30, 1942 |
| 2,388,169 | McAlevy et al. | Oct. 30, 1945 |
| 2,461,953 | Bargmeyer | Feb. 15, 1949 |
| 2,477,336 | Jennings | July 26, 1949 |
| 2,497,123 | Frolich | Feb. 14, 1950 |